UNITED STATES PATENT OFFICE.

WILLIAM G. MONK, OF BROOKLYN, NEW YORK.

IMPROVEMENT IN COMPOSITIONS FOR TILES.

Specification forming part of Letters Patent No. 162,675, dated April 27, 1875; application filed November 11, 1874.

*To all whom it may concern:*

Be it known that I, WILLIAM G. MONK, of Brooklyn, in the county of Kings and State of New York, have invented an Improvement in Compositions for Tiles, Flower-Pots, Pipes, &c., of which the following is a specification:

Sand and sulphur have been combined or mixed together to form a fusible compound for tiles, &c., and in my patent, No. 135,721, sand and sulphur are used with cement. I make use of sand, sulphur, carbonate of lime, and sal-ammoniac, or an equivalent material, such as borax, that acts in the capacity of a flux, to insure a more thorough and uniform mixture or combination of the ingredients employed. The sand is to be free from foreign matter; ordinary beach sand is preferred, and the same may be sifted. It is then moistened uniformly with a weak solution of sal-ammoniac in water, and the sand is either dried artificially or allowed to dry. About two parts of this sand are mixed with two parts of sulphur and about one part of carbonate of lime, and placed in a suitable heating-vessel, preferably a kettle heated by steam, and the mass is well stirred and heated until the sulphur melts, and the material may then be poured into molds for making tiles, flower-pots, pipes, or any other useful or ornamental articles to which the material is adapted. After the article is cool it should be removed from the mold and allowed to remain for a few days before use, as it consolidates, hardens, and the material becomes combined into a handsome, durable, and homogeneous mass. The chemical changes that take place in the material are not easily defined; but it is believed that the sal-ammoniac or borax acts as a flux, to cause the sulphur to more evenly coat the particles of sand, and that there is a chemical reaction between the sal-amoniac and sulmphur upon the carbonate of lime, to promote a more intimate union of the materials than in the compositions before employed; hence the mass is very strong, durable, free from smell, and adapted to resist the action of water and many kinds of acids. I prefer to employ a mold of sheet-zinc, and, with hollow articles, the core may be of molder's sand; but any desired character of molds may be used. Coloring matter may be introduced into the composition. When the article is removed from the mold there is generally a fine dust on the surface, giving it a frosted appearance; but when this is brushed or rubbed off the surface presents a polished appearance.

I claim as my invention—

1. The composition of sulphur, sand, and carbonate of lime, with sal-ammoniac, or equivalent flux, introduced for the purpose, and substantially as set forth.

2. In a compound of sulphur and sand, the mode herein specified of preparing the sand by moistening it with a solution of sal-ammoniac, or equivalent flux, substantially as set forth.

Signed by me this 6th day of November, A. D. 1874.

W. G. MONK.

Witnesses:
GEO. T. PINCKNEY,
CHAS. H. SMITH.